(12) United States Patent
Ebrahimi Afrouzi

(10) Patent No.: US 10,386,847 B1
(45) Date of Patent: Aug. 20, 2019

(54) SYSTEM AND METHOD FOR GUIDING HEADING OF A MOBILE ROBOTIC DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 255 days.

(21) Appl. No.: 15/410,624

(22) Filed: Jan. 19, 2017

Related U.S. Application Data

(60) Provisional application No. 62/297,403, filed on Feb. 19, 2016.

(51) Int. Cl.
*G05D 1/00* (2006.01)
*G05D 1/02* (2006.01)
*B25J 5/00* (2006.01)

(52) U.S. Cl.
CPC ............ *G05D 1/0246* (2013.01); *B25J 5/007* (2013.01); *G05D 1/0234* (2013.01); *Y10S 901/01* (2013.01)

(58) Field of Classification Search
USPC .... 700/245–264; 318/568.12, 568.16, 568.2; 901/1, 9, 46, 47
See application file for complete search history.

(56) References Cited

U.S. PATENT DOCUMENTS

| | | | |
|---|---|---|---|
| 4,119,900 A | 10/1978 | Kremnitz | |
| 5,202,661 A * | 4/1993 | Everett, Jr. | G05D 1/0255 340/522 |
| 5,804,942 A * | 9/1998 | Jeong | G05D 1/0255 318/580 |
| 5,961,571 A * | 10/1999 | Gorr | G01S 3/783 340/988 |
| 6,038,501 A * | 3/2000 | Kawakami | G05D 1/0227 701/23 |
| 6,041,274 A * | 3/2000 | Onishi | G01B 11/005 318/580 |
| 6,308,118 B1 | 10/2001 | Holmquist | |
| 7,012,551 B2 * | 3/2006 | Shaffer | B60R 1/00 315/82 |
| 7,509,213 B2 * | 3/2009 | Choi | G05D 1/0225 318/568.12 |
| 8,175,743 B2 * | 5/2012 | Nara | G01B 11/002 356/152.3 |

(Continued)

*Primary Examiner* — Jonathan L Sample

(57) ABSTRACT

The present invention introduces a method for guiding or directing the heading of a mobile robotic device. A light pattern is projected from a light emitting unit disposed on a robotic device. The angle of the plane of the projection of the light pattern with respect to a heading of the robotic device is preset, but may be any angle as desired by a manufacturer or operator. A camera positioned in a plane parallel to the plane of the light pattern projection captures images of the projected light pattern on surfaces substantially opposite the light emitting unit. Images are processed to check for reflection symmetry about a vertical centerline of the images. Upon detecting an image that does not have reflection symmetry, the robotic device turns to adjust its heading with relation to the surfaces in the environment on which the light pattern is projected. Turning amounts and directions are provided to the controller and may be based on analysis of the last image captured.

16 Claims, 7 Drawing Sheets

(56) References Cited

U.S. PATENT DOCUMENTS

| | | | | |
|---|---|---|---|---|
| 8,352,075 | B2* | 1/2013 | Cho | G06K 9/00201 |
| | | | | 700/245 |
| 8,452,450 | B2* | 5/2013 | Dooley | B60L 50/66 |
| | | | | 700/258 |
| 8,521,352 | B1* | 8/2013 | Ferguson | G05D 1/0274 |
| | | | | 701/25 |
| 8,781,627 | B2* | 7/2014 | Sandin | G05D 1/0225 |
| | | | | 700/258 |
| 9,327,407 | B2* | 5/2016 | Jones | G05D 1/0219 |
| 9,392,920 | B2* | 7/2016 | Halloran | A47L 5/30 |
| 2002/0051128 | A1* | 5/2002 | Aoyama | G01S 7/4811 |
| | | | | 356/4.03 |
| 2004/0210344 | A1* | 10/2004 | Hara | B64C 33/025 |
| | | | | 700/245 |
| 2005/0134440 | A1* | 6/2005 | Breed | B60N 2/2863 |
| | | | | 340/435 |
| 2006/0058921 | A1* | 3/2006 | Okamoto | G05D 1/0214 |
| | | | | 700/255 |
| 2006/0129276 | A1* | 6/2006 | Watabe | G05D 1/0234 |
| | | | | 700/245 |
| 2006/0136097 | A1* | 6/2006 | Kim | G05D 1/0234 |
| | | | | 700/258 |
| 2007/0192910 | A1* | 8/2007 | Vu | B25J 5/007 |
| | | | | 700/245 |
| 2007/0250212 | A1* | 10/2007 | Halloran | A47L 5/30 |
| | | | | 700/245 |
| 2007/0285041 | A1* | 12/2007 | Jones | G05D 1/0219 |
| | | | | 318/568.12 |
| 2008/0039974 | A1* | 2/2008 | Sandin | G05D 1/0225 |
| | | | | 700/258 |
| 2009/0118890 | A1* | 5/2009 | Lin | G05D 1/0246 |
| | | | | 701/28 |
| 2010/0172136 | A1* | 7/2010 | Williamson, III | F41H 13/00 |
| | | | | 362/259 |
| 2010/0292884 | A1* | 11/2010 | Neumann | G05D 1/0225 |
| | | | | 701/25 |
| 2011/0288684 | A1* | 11/2011 | Farlow | B25J 11/009 |
| | | | | 700/264 |
| 2012/0078417 | A1* | 3/2012 | Connell, II | B25J 5/00 |
| | | | | 700/248 |
| 2012/0182392 | A1* | 7/2012 | Kearns | B25J 11/009 |
| | | | | 348/46 |
| 2012/0206336 | A1* | 8/2012 | Bruder | G01B 11/026 |
| | | | | 345/156 |
| 2013/0094668 | A1* | 4/2013 | Poulsen | H03G 3/301 |
| | | | | 381/107 |
| 2013/0105670 | A1* | 5/2013 | Borosak | B60Q 1/143 |
| | | | | 250/214.1 |
| 2013/0138246 | A1* | 5/2013 | Gutmann | G05D 1/0231 |
| | | | | 700/253 |
| 2013/0226344 | A1* | 8/2013 | Wong | G05D 1/024 |
| | | | | 700/258 |
| 2013/0245937 | A1* | 9/2013 | DiBernardo | G01S 5/163 |
| | | | | 701/514 |
| 2013/0325244 | A1* | 12/2013 | Wang | G05D 1/028 |
| | | | | 701/26 |
| 2014/0074287 | A1* | 3/2014 | LaFary | G06N 3/008 |
| | | | | 700/253 |
| 2014/0088761 | A1* | 3/2014 | Shamlian | G05D 1/0238 |
| | | | | 700/253 |
| 2014/0324270 | A1* | 10/2014 | Chan | G01S 17/42 |
| | | | | 701/28 |
| 2015/0054639 | A1* | 2/2015 | Rosen | G06K 9/00785 |
| | | | | 340/439 |
| 2015/0125035 | A1* | 5/2015 | Miyatani | B25J 9/1697 |
| | | | | 382/103 |
| 2015/0168954 | A1* | 6/2015 | Hickerson | G01S 17/026 |
| | | | | 700/259 |
| 2015/0202770 | A1* | 7/2015 | Patron | G05D 1/024 |
| | | | | 700/245 |
| 2015/0234385 | A1* | 8/2015 | Sandin | G05D 1/0225 |
| | | | | 700/258 |
| 2016/0096272 | A1* | 4/2016 | Smith | B25J 9/163 |
| | | | | 700/253 |
| 2016/0121487 | A1* | 5/2016 | Mohan | B25J 13/006 |
| | | | | 700/248 |
| 2016/0188985 | A1* | 6/2016 | Kim | G01S 17/46 |
| | | | | 701/28 |
| 2016/0375592 | A1* | 12/2016 | Szatmary | B25J 5/00 |
| | | | | 700/255 |
| 2017/0036349 | A1* | 2/2017 | Dubrovsky | B43L 13/022 |

* cited by examiner

SYSTEM AND METHOD FOR GUIDING HEADING OF A MOBILE ROBOTIC DEVICE

CROSS-REFERENCE TO RELATED APPLICATIONS

This application claims the benefit of the provisional patent application Ser. No. 62/297,403 filed Feb. 19, 2016 by the present inventor.

FIELD OF INVENTION

The present invention relates to methods for automatically guiding or directing the heading of a mobile robotic device.

BACKGROUND

Mobile robots are being used with increased frequency to accomplish a variety of routine tasks. In some cases, a mobile robot has a heading, or a front end which is ideally positioned towards the location where work should begin. It may be beneficial in some cases for a mobile robot to be able to automatically sense the direction of its heading in relation to parts of an environment, for example, the walls of a room, so that it may maintain a desired heading in relation thereto.

In some cases, simultaneous localization and mapping (SLAM) is used to identify the location and orientation of a robot, however this solution requires extra components which are expensive and more processing power and time. A need exists for a more simple way to determine a robot's orientation in an environment that does not unreasonably increase the cost of a robot.

SUMMARY

It is a goal of the present invention to provide a cost-effective method for a mobile robot to automatically sense and adjust its heading with relation to surfaces in a work area.

DETAILED DESCRIPTION OF THE INVENTION

The present invention relates to a method for guiding or directing the heading of a mobile robotic device.

One or more collimated light emitters positioned on a mobile robotic device emit collimated light beams in a predetermined pattern. The light pattern may be comprised of simply two light points, or may be more complex. For the purposes of this teaching, a pattern comprised of two light points will be used as an example. However, any pattern may be used without limitation. The one or more light emitters are positioned such that light is emitted in a predetermined plane onto surfaces in front of the one or more light emitters. A camera positioned on the mobile robotic device captures images of the light pattern as it is projected upon surfaces substantially opposite the light emitters. The captured images are sent to a processor electrically coupled to the camera. The processor analyzes the images to determine whether the image of the light pattern is distorted. Distortion of the image will occur if the plane upon which the image is projected is not parallel to the plane in which the light is emitted. If the image is distorted, the plane of light emission is not parallel to the surface upon which the light is being projected. If the image is not distorted, the plane of light emission is parallel to the surface upon which the light is being projected. Depending on the results of the image analysis, the device may take any of a variety of actions to maintain or correct its heading.

Figure 1A:
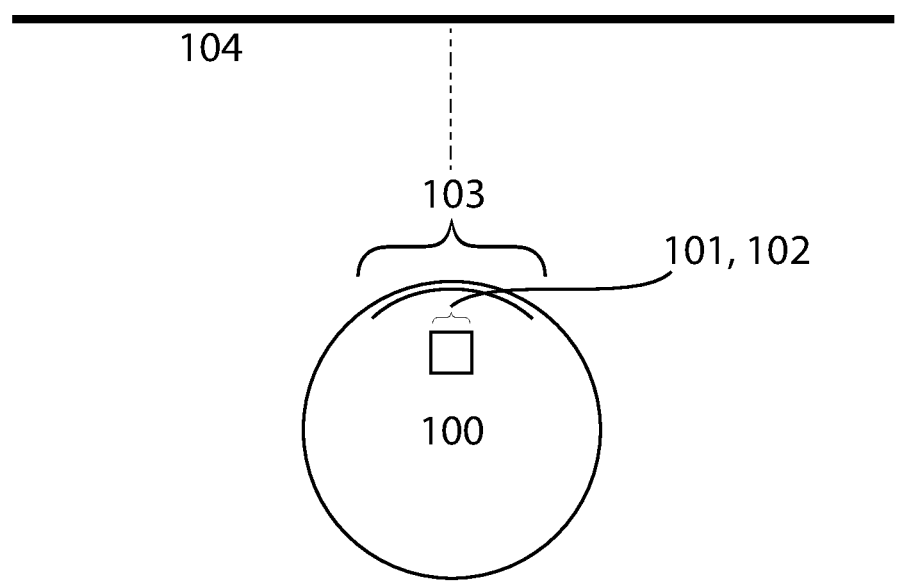
FIG. 1A illustrates an overhead view of a mobile robotic device with a camera and light emitter pair arranged to maintain a heading perpendicular to walls embodying features of the present invention.
Figure 1B:
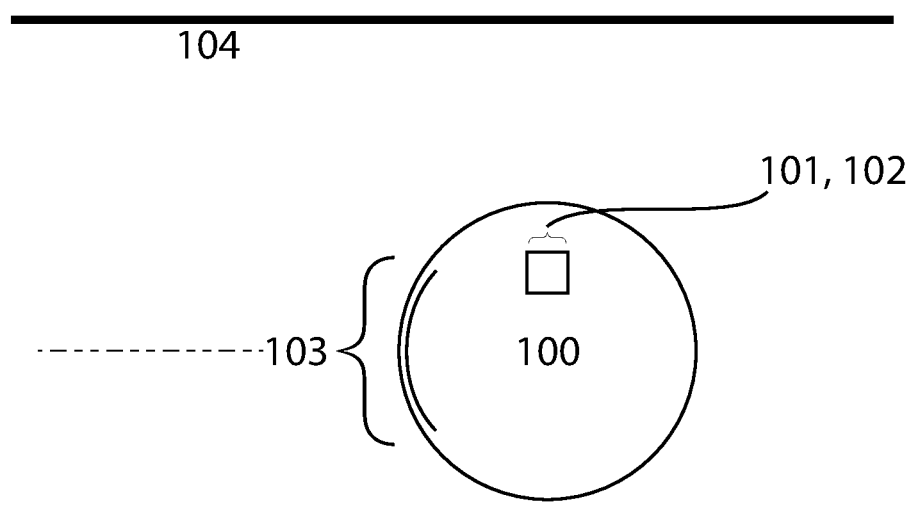
FIG. 1B illustrates an overhead view of a mobile robotic device with a camera and light emitter pair arranged to maintain a heading parallel to walls embodying features of the present invention.

The system may be used to maintain any heading positioned desired; it is the light emitter and camera that will be maintained in a position parallel to surfaces upon which the light is projected, so the position of the light emitter and camera relative to the heading of the mobile robotic device will determine what heading will be maintained. For example, if it is desired to maintain a robotic device heading perpendicular to walls in the workspace, the light emitter and camera should be positioned parallel to the heading of the mobile robotic device. This way, when the camera and light emitter are perpendicular to the plane of the wall, the heading of the mobile robotic device will also be perpendicular to the wall. This is illustrated in FIG. 1A, where robotic device 100 has a camera and light emitter pair 101, 102 that are oriented in the same direction has the heading 103 of the robotic device. When the camera and light emitter pair 101, 102 are perpendicular to the wall 104, the heading of robotic device is also perpendicular thereto. Referring to FIG. 1B, if it is desired to maintain a robotic device heading parallel to walls in the workspace, the light emitter and camera should be positioned perpendicular to the heading of the mobile robotic device. In FIG. 1B, the camera and light emitter pair 101, 102 are positioned perpendicular to the heading 103 of the robotic device 100. This way, when the camera and light emitter 101, 102 are perpendicular to the wall 104, the heading 103 of the mobile robotic device 100 will be parallel to the wall 104. The particular positioning of the camera and light emitter relative to the heading of the mobile robotic device is not limited to the examples shown here and may be any position as desired by a manufacturer or operator. The camera and light emitter may be positioned at 10 degrees, 30 degrees, 45 degrees, or any angle with respect to the heading of the mobile robotic device.

Figure 2A:
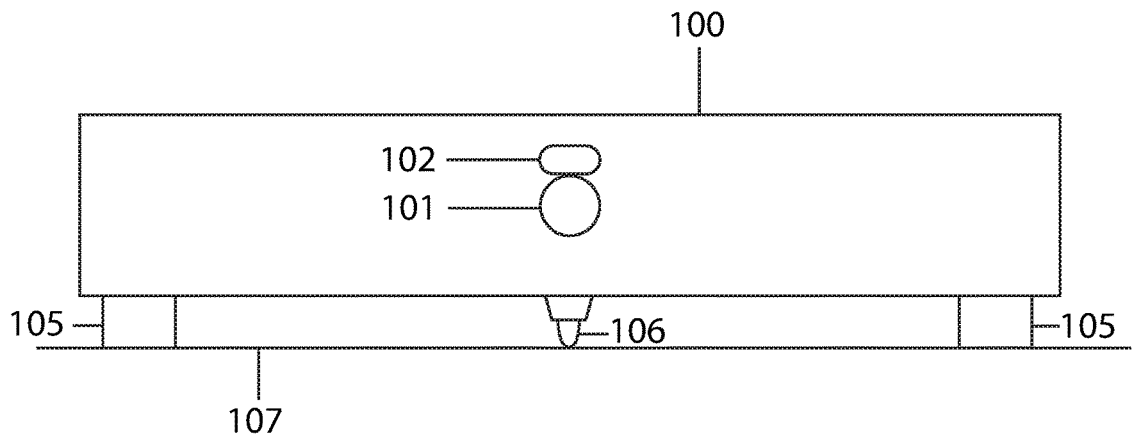
FIG. 2A illustrates a front elevation view of a mobile robotic device with a camera and light emitter pair embodying features of the present invention.

Referring to FIG. 2A, a front elevation view of a mobile robotic device 100 is illustrated. A light emitter 101 and camera 102 are positioned on the mobile robotic device 100. Positioned in this manner, the system will keep the heading of the mobile robotic device perpendicular to surfaces in the work environment. In the example shown, the mobile robotic device also comprises left and right wheels 105 and a front wheel 106. The mobile robotic device is positioned on a work surface 107.

Figure 2B:
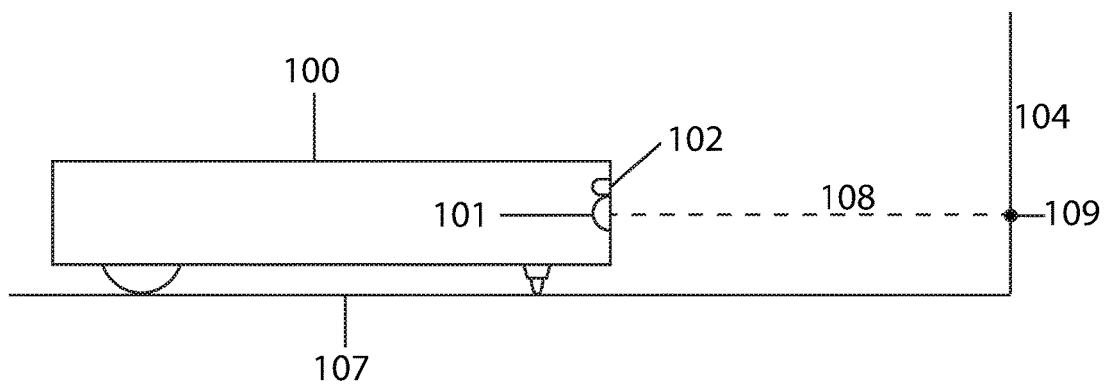
FIG. 2B illustrates a side elevation view of a mobile robotic device with a camera and light emitter pair embodying features of the present invention.

Referring to FIG. 2B, a side elevation view of the mobile robotic device 100 is illustrated. The projected light emissions from the light emitter 101 are represented by the dashed line 108. Again, the camera 102 can be seen positioned on the mobile robotic device in a manner such that it may capture images of the area where light emissions are projected. The mobile robotic device is positioned on the work surface 107 with its heading toward wall 104. In this position, light emissions 108 will be projected onto the wall 104 at or around the point 109.

Figure 3A:
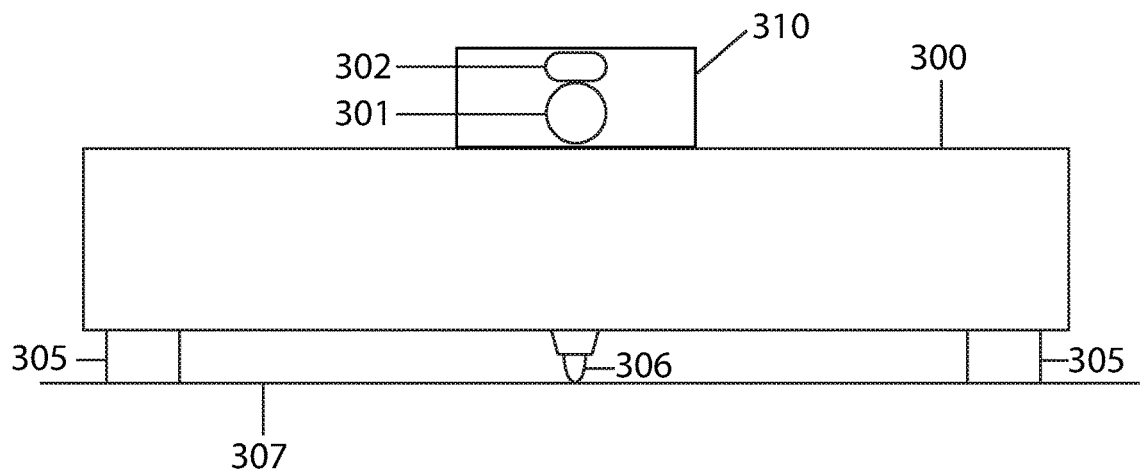
FIG. 3A illustrates a front elevation view of a mobile robotic device with a camera and light emitter pair on a rotatable housing embodying features of the present invention.
Figure 3B:
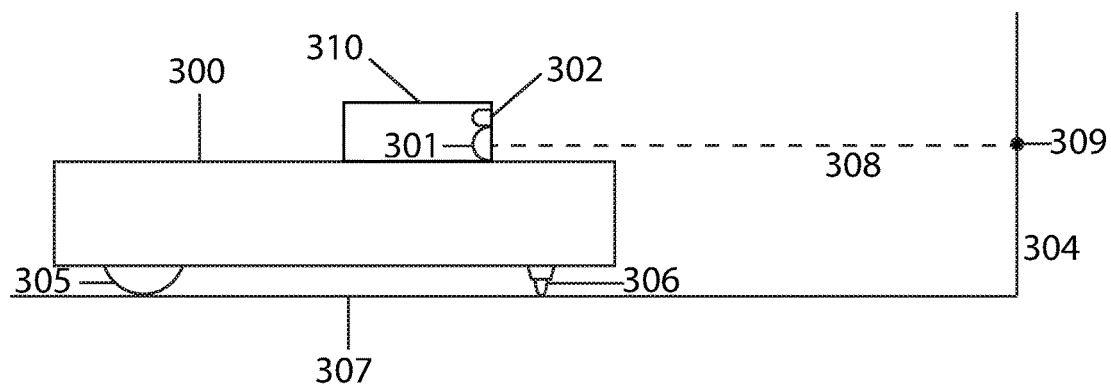
FIG. 3B illustrates a side elevation view of a mobile robotic device with a camera and light emitter pair on a rotatable housing embodying features of the present invention.

Referring to FIGS. 3A and 3B, an alternative embodiment of the invention is illustrated. FIG. 3A illustrates a front elevation view of robotic device 300. In this embodiment, the light emitter 301 and camera 302 are positioned on a rotatable housing 310 that is positioned on the mobile robotic device. The housing 310 may be rotated relative to the mobile robotic device 300. In the example shown, the mobile robotic device also comprises left and right wheels 305 and a front wheel 306. The mobile robotic device is positioned on a work surface 307.

Referring to FIG. 3B, a side elevation view of robotic device 300 is illustrated. The light emitter 301 and camera 302 are positioned on the rotatable housing 310. The projected light emissions from the light emitter 301 are represented by the dashed line 308. Again, the camera 302 can be seen positioned in a manner such that it may capture images of the area where light emissions are projected. The mobile robotic device also comprises wheels 305 and front wheel 306. The mobile robotic device is positioned on the work surface 307 and facing a wall 304. In this position, light emissions will be projected onto the wall 304 at or around the point 309.

Positioning the light emitter and camera on a rotatable housing serves to allow an operator to adjust the heading angle that the robotic device will maintain with relation to surfaces in the environment. An operator could rotate the housing 310 so that the robotic device maintains a heading perpendicular to surfaces, parallel to surfaces, at a 45 degree angle to surfaces, or any other angle without limitation.

In some embodiments, a mobile robotic device may contain a plurality of light emitter and camera sets positioned to be projected on and capture images of multiple surfaces.

In the preferred embodiment, two sets of one light emitter and one camera are positioned parallel to and opposite one another to face two opposing directions. This configuration would permit a mobile robotic device to locate a reference surface with less movement than embodiments with only one light emitter and one camera.

Figure 4A:
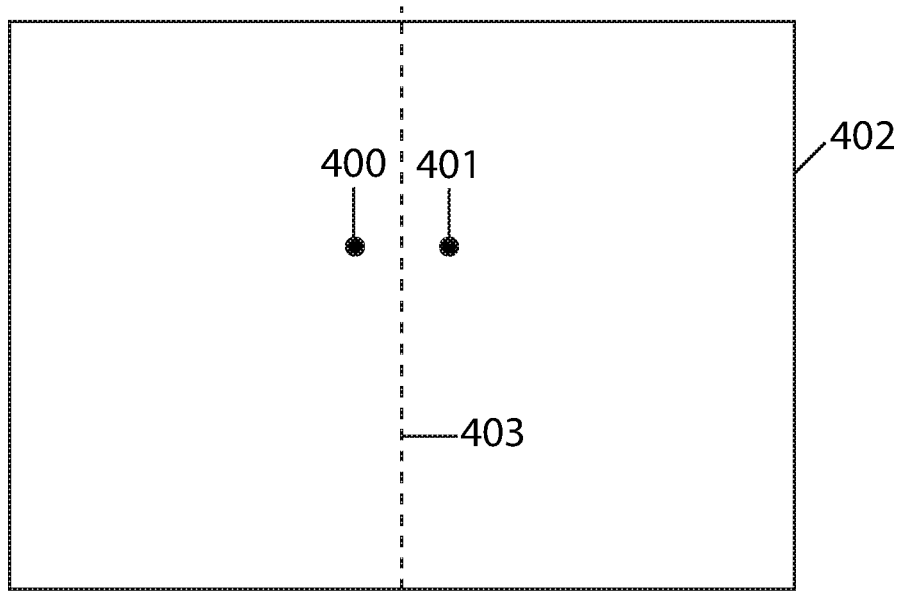
FIG. 4A illustrates a front elevation view of a light pattern captured by a camera embodying features of the present invention.
Figure 4B:
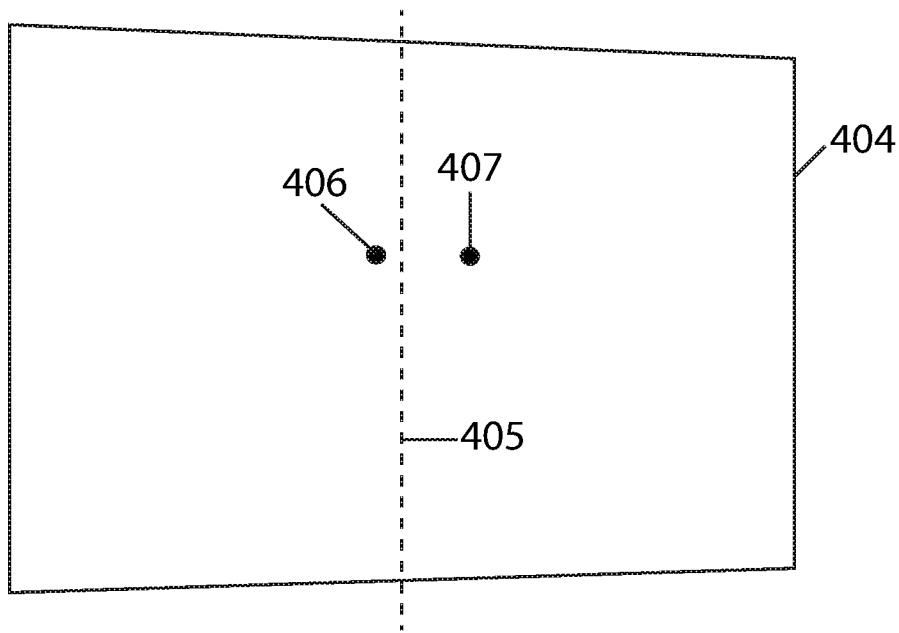
FIG. 4B illustrates a front elevation view of a light pattern captured by a camera embodying features of the present invention.

Referring to FIG. 4A, a front elevation view of a light pattern captured by a camera is illustrated. The two points 400, 401 represent the light pattern emitted by a light emitter (not shown). When the image 402 is divided in half by a vertical centerline 403, the two sides of the image are mirror images. By dividing the image in half in this way and comparing the halves, the processor may determine whether there is any distortion in the image. Referring to FIG. 4B, the same light pattern projected onto a surface the plane of which is not parallel to the plane of the light emitter and camera lens is illustrated. When this image 404 is divided in half by the vertical centerline 405 and the halves are compared, they are not a mirror image of each other. The point 406 is closer to the centerline than the point 407. Thus, the processor may determine that the plane upon which the light is projected is not parallel to the plane of light emission.

In some embodiments, upon detecting image distortion as described above, the mobile robotic device may be caused to turn a predetermined amount, and repeat the process of emitting the light pattern, capturing an image, and checking for distortion until such a time as the system finds there is substantially no distortion in the image.

Figure 5A:
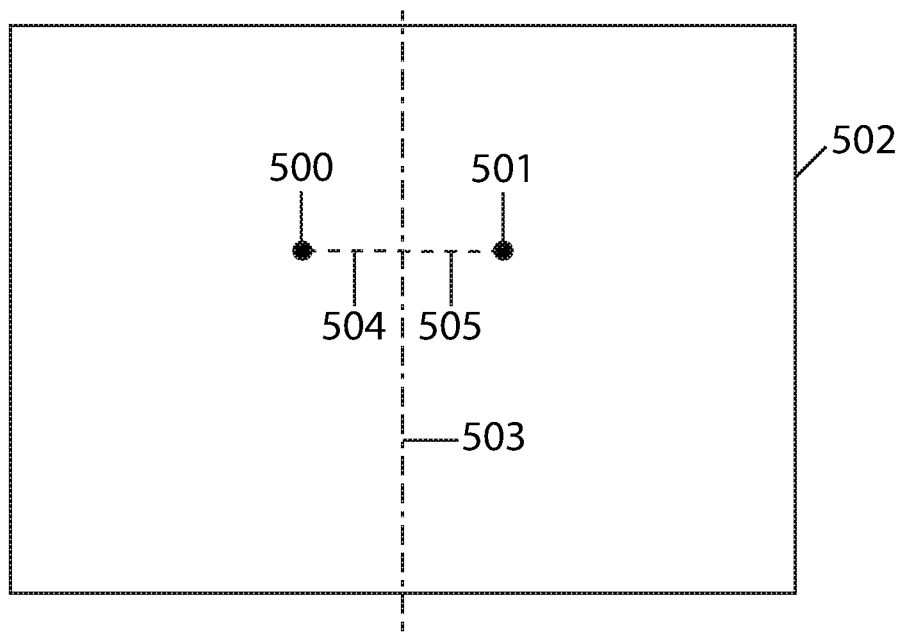
FIG. 5A illustrates a front elevation view of a light pattern captured by a camera embodying features of the present invention.

In some embodiments, the processor is provided with data to assist with decision-making. Images of the projected light pattern are captured and analyzed. Referring to FIG. 5A, when the image 502 is divided in half by a vertical centerline 503, the distance from the centerline to each point 500, 501 may be measured by counting the number of columns of unilluminated pixels found between the centerline and the first illuminated pixel (the projected light) in both left and right directions. These distances may then be compared to determine whether the points are the same distance from the centerline. In FIG. 5A, the distances 504 and 505 are substantially the same, and thus the system may conclude that there is no distortion in the image and the plane of the surface on which the light is projected is parallel to the plane in which the light was emitted. In this case, the mobile robotic device would be caused to maintain, not adjust its heading.

Figure 5B:
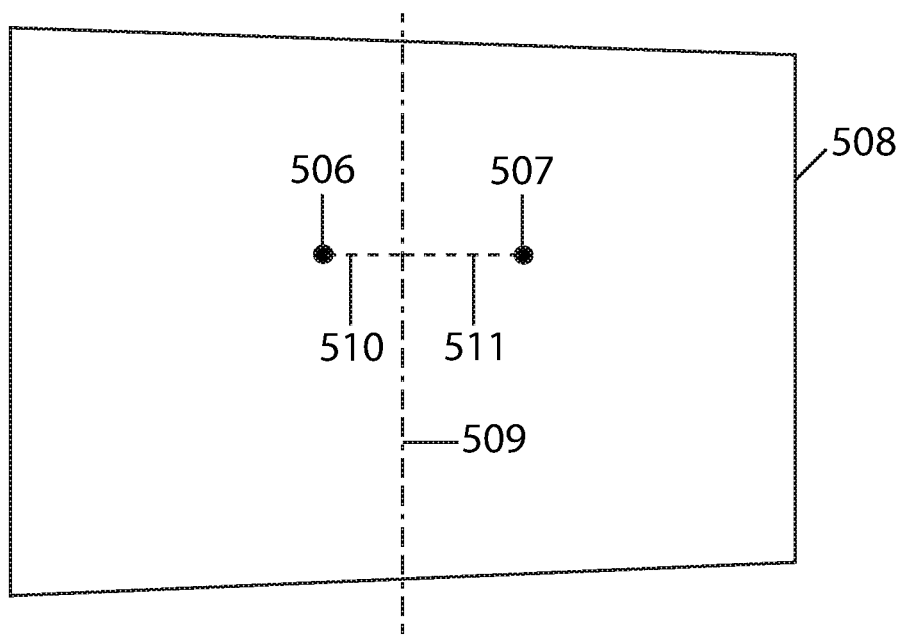
FIG. 5B illustrates a front elevation view of a light pattern captured by a camera embodying features of the present invention.

Referring to FIG. 5B, when the image 508 is divided in half by a vertical centerline 509, the distance from the centerline to each point 506, 507 may be measured in the same manner as last described, by counting the number of columns of unilluminated pixels found between the centerline and the first illuminated pixel in both left and right directions. In this example, when compared, the distance 510 is smaller than the distance 511. The mobile robotic device shall be caused to adjust its heading by turning or rotating in the direction of the side on which the greater distance from the centerline to the illuminated pixel is detected. In some embodiments, the system may be provided with the following formula for calculating the turning angle:

$$[F(A)-F(B)]*g(x) \propto \text{turning angle}$$

wherein F(A) is a function of the counted distance from the centerline to the first illuminated pixel in a left direction, F(B) is a function of the counted distance from the centerline to the first illuminated pixel in a right direction, x is a multidimension array which contains specific parameters of the position of the illuminated pixels and the camera in relation to each other, and g(x) is a transform function of x.

Based on the above formula, if A is larger than B, the result will be positive, and the device will be caused to turn in a positive (clockwise) direction. If B is larger than A, the result will be negative, causing the device to turn in a negative (counterclockwise) direction.

Figure 6:
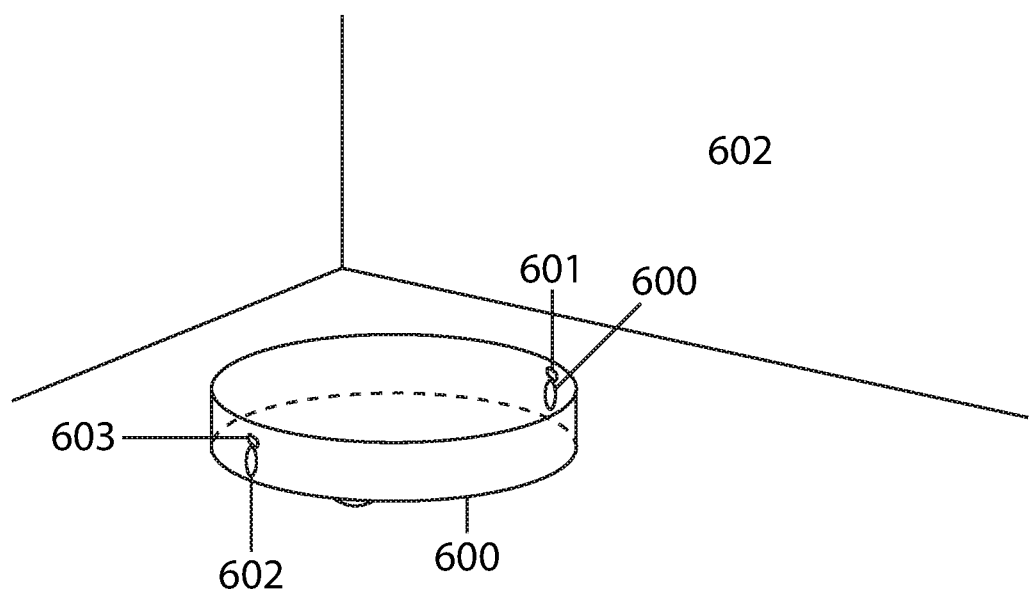
FIG. 6 illustrates a perspective view of a mobile robotic device with two camera and light emitter pairs embodying features of the present invention.

Referring to FIG. 6, a perspective view of an embodiment of the invention with two light emitter and camera pairs is shown. The robotic device 600 has a first light emitter 600 and camera 601 positioned in a first position perpendicular to the surface 500. A second light emitter 602 and camera 603 are positioned in a second position opposite of the first light emitter 600 and camera 601.

Figure 7:
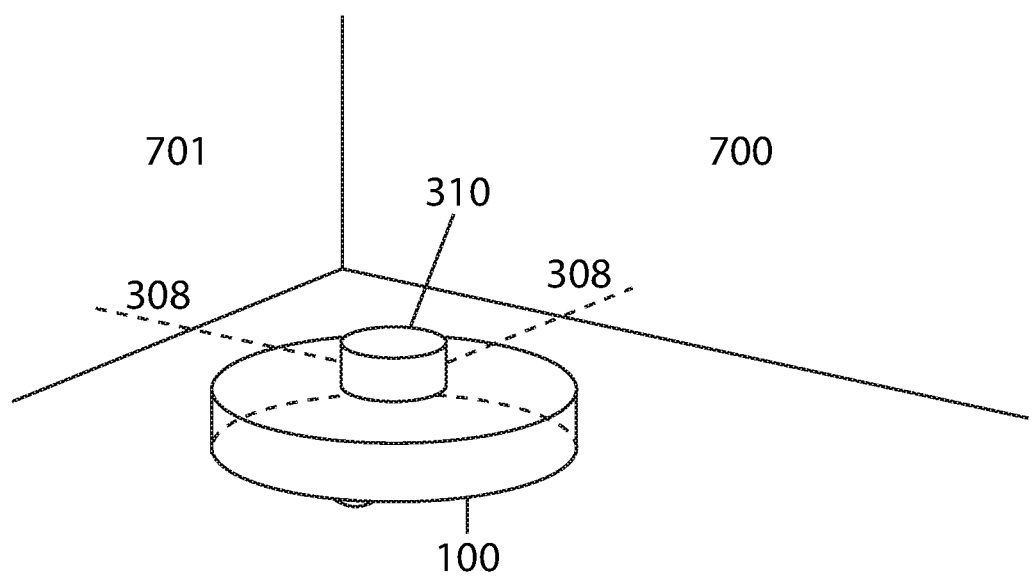
FIG. 7 illustrates a perspective view of a mobile robotic device with two camera and light emitter pairs on a rotatable housing embodying features of the present invention.

Referring to FIG. 7, a perspective view of an embodiment of the invention with multiple light emitter and camera pairs positioned on a rotatable housing is illustrated. The rotatable housing 310 is positioned on robotic device 100. Two light emitter and camera pairs are positioned on the housing (not shown) to emit and capture images of light on surfaces (700, 701) in two directions concurrently. The dashed lines 308 represent the projected light emissions from the light emitters.

In some embodiments, the method uses a machine learning algorithm to teach itself how to get to a desired heading faster. The two illuminated points may be identified by dividing the space in the captured image into a grid and finding the x and y coordinates of the illuminated points. The x coordinates will have positions in relevance to a virtual vertical centerline. For each pair of x coordinates, an action (movement of the robotic device) will be assigned which, based on prior measurements, is supposed to change the heading of the robotic device to the desired heading with respect to the surface on which the points are projected.

Because a robotic device's work environment is stochastic, sensor measurements are prone to noise, and actuators are subject to systematic bias, there will be overshooting, undershooting and other unpredicted situations which will lead the robotic device to end up with a heading that is not exactly the desired heading in spite of the system predictions. In order to compensate for the above, the method uses machine learning techniques to further enhance the turning process of finding the perpendicular state more accurately and faster.

Pre-measured data shall be provided during an initial set-up phase or during manufacture, which will be divided into two sets: training set and test set.

Training set data and test set data are entered into the system. With each set of x coordinates and relative position to the virtual vertical centerline, there is an associated action, which changes the heading of the robot to the desired heading. From this correspondence, the machine devises a function, which maps every relative position to an action.

From the initial training set, the robotic device devises a policy to associate a particular action with each sensed data point.

In a first step, the robotic device will use its test set data to measure the accuracy of its function or policy. If the policy is accurate, it continues to use the function. If the policy is not accurate, the robotic device revises the function until the testing shows a high accuracy of the function.

As the system gathers new data, or more correspondence between the x coordinates and the resulting action, the system revises the function to improve the associated actions.

A person skilled in the art will appreciate that different embodiments of the invention can use different machine learning techniques, including, but not limited to: supervised learning, unsupervised learning, reinforcement learning, and semi-supervised learning.

I claim:

1. A method for maintaining or correcting a heading of a robotic device relative to surfaces in a work environment comprising:
   in a first step, projecting a light pattern from a light emitting unit positioned on a robotic device in a plane with a preset relationship to a heading of the robotic device onto surfaces substantially opposite the light emitting unit;
   in a second step, capturing an image of the projected light pattern by a camera positioned on the robotic device in a plane parallel to the plane of the light emitting unit;
   in a third step, processing the image with a processor provided on the robotic device to virtually divide the image in half vertically and determine whether the image has reflection symmetry about a vertical centerline; and
   in a fourth step, if the image does not have reflection symmetry, adjusting the heading of the robotic device and repeating the first through fourth steps until such a time as a captured image is determined to have reflection symmetry.

2. The method of claim 1 wherein the light emitting unit and camera are provided on a housing rotatable with respect to a main body of the robotic device.

3. The method of claim 1 wherein reflection symmetry in images is analyzed by counting a number of columns of pixels found between a centerline of the image and a first column of pixels containing at least one pixel illuminated by the projected light pattern in both leftward and rightward directions from the centerline.

4. The method of claim 1 wherein a turning angle is calculated using the formula:

$$[F(A)-F(B)]*g(x) \propto \text{turning angle}$$

where F(A) is a function of the distance from a centerline of the image to a first pixel lighted by the light projection in left direction,
F(B) is a function of the distance from a centerline of the image to a first pixel lighted by the light projection in a right direction,
x is a multidimension array containing one or more parameters of the position of the light projection and the camera in relation to each other, and,
g(x) is a transform function of x,
whereby a positive result corresponds with a clockwise turning direction and a negative result corresponds with a counterclockwise turning direction.

5. The method of claim 1 further comprising:
in a fifth step, identifying a position of a first point of the projected pattern by a first set of coordinates;
in a sixth step, identifying a position of a second point of the projected pattern by a second set of coordinates;
in a seventh step, calculating an amount of asymmetry between the first point and the second point with relation to a centerline of the image by comparing the first and second sets of coordinates;
in an eighth step, acquiring a rotation amount corresponding to the calculated asymmetry amount from a reference table of rotation amounts saved in a memory unit of the robotic device, each rotation amount in the table corresponding to an asymmetry amount and aimed at adjusting the heading of the robotic with respect to opposing surfaces according to a preset desired heading;

in a ninth step, rotating the robotic device the rotation amount corresponding to the calculated asymmetry amount in the table;

in a tenth step, repeating the fifth through seventh steps to find a second asymmetry amount;

in an eleventh step, if the absolute value of the second asymmetry amount is greater than a predetermined threshold, adjusting the reference table rotation figures by a function of the absolute value of the second asymmetry amount; and iteratively repeating the fifth through eleventh steps at predetermined intervals and continuing to adjust the reference table throughout work.

6. A heading-correcting robotic device comprising:
a chassis including a set of wheels;
a motor to drive the wheels;
a battery to provide power to the robotic device;
a controller in communication with the motor and wheels, the controller including a processor operable to control the motor and wheels to steer movement of the robotic device;
a light emitting unit for projecting a predetermined light pattern onto surfaces substantially opposite the light emitting unit;
a camera for capturing images of the projected light pattern; and
an image processor for processing the captured images to determine whether they have reflection symmetry;
wherein, upon detecting that an image has less than a threshold amount of reflection symmetry, the robotic device adjusts its heading by turning in a left or right direction.

7. The heading-correcting robotic device of claim 6 wherein the turning angle is calculated using the formula:

$$[F(A)-F(B)]*g(x) \propto \text{turning angle}$$

where F(A) is a function of the distance from a centerline of an image to a first pixel lighted by the light projection in left direction;

F(B) is a function of the distance from a centerline of the image to a first pixel lighted by the light projection in a right direction;

x is a multidimension array containing one or more parameters of the position of the light projection and the camera in relation to each other; and g(x) is a transform function of x;

whereby a positive result corresponds with a rightward turning direction and a negative result corresponds with a leftward turning direction.

8. The heading-correcting robotic device of claim 6 wherein the light emitting unit and camera are provided on a housing rotatable with respect to the chassis of the robotic device.

9. The heading-correcting robotic device of claim 6 wherein reflection symmetry in images is assessed by counting a number of columns of pixels found between a centerline of an image and a first column of pixels that is illuminated by the projected light pattern in both left and right directions from the centerline.

10. The heading-correcting robotic device of claim 6 wherein reflection symmetry in images is assessed by:
identifying a position of a first point of the projected pattern by a first set of coordinates;
identifying a position of a second point of the projected pattern by a second set of coordinates; and
calculating an amount of asymmetry between the first point and the second point with relation to a centerline of the image by comparing the first and second sets of coordinates;

and a turning direction and degree for adjusting the heading is determined by:
consulting a reference table saved in a memory unit of the robotic device, the reference table comprised of asymmetry amounts and corresponding rotation amounts, each rotation amount in the table aimed at correcting the heading of the robotic device with respect to opposing surfaces according to a preset desired heading.

11. The heading-correcting robotic device of claim 10 wherein the robotic device is further configured to:
repeat the process for assessing reflection symmetry to find a second asymmetry amount; and,
if the absolute value of the second asymmetry amount is greater than a predetermined threshold, adjust the reference table rotation amounts by a function of the absolute value of the second asymmetry amount.

12. A method for maintaining or correcting a heading of a robotic device relative to a surface in a work environment comprising:
projecting a light pattern from a light emitting unit disposed on a robotic device, the light pattern being projected in a plane with a preset relationship to a heading of the robotic device onto surfaces substantially opposite the light emitting unit;
capturing an image of the projected light pattern by a camera disposed on the robotic device in a plane parallel to the plane of the light emitting unit;
processing the image with a processor disposed on the robotic device to determine whether the image has reflection symmetry about a vertical centerline of the image; and
if the image has less than a threshold amount of reflection symmetry, adjusting the heading of the robotic device and repeating the process until such a time as a captured image is determined to have at least the threshold amount of reflection symmetry.

13. The method of claim 12 wherein the light emitting unit and camera are provided on a housing rotatable with respect to a main body of the robotic device.

14. The method of claim 12 wherein reflection symmetry in images is analyzed by counting a number of columns of pixels found between a centerline of the image and a first column of pixels that contains at least one pixel illuminated by the projected light pattern in both leftward and rightward directions from the centerline.

15. The method of claim 12 wherein a turning angle for adjusting the heading of the robotic device is calculated using the formula:

$$[F(A)-F(B)]*g(x) \propto \text{turning angle}$$

where F(A) is a function of the distance from a centerline of the image to a first pixel lighted by the light projection in left direction, F(B) is a function of the distance from a centerline of the image to a first pixel lighted by the light projection in a right direction, x is a multidimension array containing one or more parameters of the position of the light projection and the camera in relation to each other, and, g(x) is a transform function of x, whereby a positive result corresponds with a clockwise turning direction and a negative result corresponds with a counterclockwise turning direction.

16. The method of claim 12 further comprising:

identifying a position of a first point of the projected pattern by a first set of coordinates;

identifying a position of a second point of the projected pattern by a second set of coordinates;

calculating an amount of asymmetry between the first point and the second point with relation to a centerline of the image by comparing the first and second sets of coordinates;

acquiring a rotation amount corresponding to the calculated asymmetry amount from a reference table of rotation amounts saved in a memory unit of the robotic device, each rotation amount in the table corresponding to an asymmetry amount and aimed at adjusting the heading of the robotic with respect to opposing surfaces according to a preset desired heading;

rotating the robotic device the rotation amount corresponding to the calculated asymmetry amount in the table;

repeating the steps to find a second asymmetry amount;

if the absolute value of the second asymmetry amount is greater than a predetermined threshold, adjusting the reference table rotation figures by a function of the absolute value of the second asymmetry amount; and iteratively repeating this process at predetermined intervals and continuing to adjust the reference table throughout work.

* * * * *